United States Patent [19]

Küsel et al.

[11] Patent Number: 5,460,261
[45] Date of Patent: Oct. 24, 1995

[54] TUBULAR CONVEYOR BELT

[75] Inventors: Bernd Küsel, Hamburg; Karl-Heinz Elvers, Buxtehude; Christian Heidelmann, Hamburg; Hasso Tonn, Buxtehude, all of Germany

[73] Assignee: Phoenix Aktiengesellschaft, Hamburg, Germany

[21] Appl. No.: 132,565

[22] Filed: Oct. 6, 1993

[30] Foreign Application Priority Data

Oct. 8, 1992 [DE] Germany .............. 42 33 848.4

[51] Int. Cl.⁶ ...................................... B65G 15/08
[52] U.S. Cl. ...................................... 198/819; 198/847
[58] Field of Search ...................................... 198/819, 847

[56] References Cited

U.S. PATENT DOCUMENTS

| 4,813,533 | 3/1989 | Long ............................. 198/847 |
| 4,877,126 | 10/1989 | van Calker et al. ............ 198/847 |
| 5,060,787 | 10/1991 | Tingskog ....................... 198/819 |

FOREIGN PATENT DOCUMENTS

| 0046690 | 3/1986 | European Pat. Off. . |
| 0336385 | 3/1993 | European Pat. Off. . |
| 943817 | 6/1956 | Germany . |
| 2800454 | 7/1979 | Germany . |
| 3228937 | 2/1984 | Germany . |
| 2944448 | 10/1984 | Germany . |
| 3145899 | 11/1984 | Germany . |
| 3122664 | 6/1985 | Germany . |
| 3606129 | 8/1986 | Germany . |
| 3506947 | 8/1986 | Germany . |
| 3612765 | 10/1987 | Germany . |
| 3839061 | 5/1990 | Germany ............... 198/819 |
| 0112516 | 6/1985 | Japan .................... 198/819 |
| 0144209 | 7/1985 | Japan .................... 198/819 |
| 0218412 | 9/1988 | Japan .................... 198/819 |
| 8905765 | 6/1989 | WIPO .................... 198/819 |
| 9201076 | 7/1992 | WIPO .................... 198/819 |

*Primary Examiner*—D. Glenn Dayoan
*Attorney, Agent, or Firm*—Collard & Roe

[57] ABSTRACT

A device for transporting materials along supporting rollers including a conveyor belt extending in a longitudinal direction. The device has two spaced longitudinal edges and a tensile fabric layer embedded within the conveyor belt made of a textile, a cord fabric or a synthetic cord fabric. The supports extend in the longitudinal direction, and the conveyor belt is adapted for being rolled into a tubular belt, wherein the two longitudinal edges overlap each other and are supported by the supporting rollers. Stiff textile reinforcements are embedded within the conveyor belt on a side of the fabric layer facing the support rollers. The textile reinforcements are oriented transverse to the longitudinal direction.

18 Claims, 6 Drawing Sheets

TUBULAR CONVEYOR BELT

BACKGROUND OF THE INVENTION

1. Field of the Invention

The present invention relates to a conveyor belt made of rubber or a rubber-like plastic, with tension supports based on a fabric (warp, weft) made of textile materials (e.g. polyester warp, polyamide weft) or a synthetic cord fabric (e.g. polyester cord, polyamide auxiliary weft). The supports are embedded in the conveyor belt and extend in the longitudinal direction, whereby the fabric or cord fabric is arranged in one or two multiple layers, in particular in two or three layers, with or without an intermediate rubber coating. The belt is closed by overlapping its longitudinal edges to form a tubular belt supported by rollers or the like.

2. The Prior Art

German Patent DE-C-943,817 discloses a hose belt conveyor which did not initially find wide application. However, this closed conveyor system has been further developed during the last 10 years. Within the inlet and outlet sections, the conveyor belt forms a trough in the same way as conventional belt conveyors. However, the belt closes across the transport and return run sections, forming a tube (tubular conveyor belt, hose belt, roller belt).

The following equipment parts are required for this transport system: annularly arranged supporting rollers (German Patents DE-C-3,145,899 and DE-A-3,606,129), correction rollers (German Patent DE-C-3,122,664) and strands (e.g., top and bottom strands). As compared to the conventional belt conveyors, the closed transport system is characterized by the following advantages: it is particularly capable of traveling through curves, it has a particularly high ascent capability, it saves space, and it protects the conveyed material and the environment (e.g., when conveying dusty material). However, these advantages are weighed against great technical problems that accompany the development of the hose belt or tubular belt conveyor. This is demonstrated by the following state of the art.

According to German Patent DE-A-3,228,937 and German Patent DE-A-3,506,947, the conveyor belt has clamping strips or radially outwardly projecting, longitudinally extending bridges within the closing zone. This locking mechanism, however, has the drawback that an additional roller system (guiding rollers, pressure rollers) is required in addition to the supporting and correcting rollers. In addition, the clamping strips or bridges are susceptible to wear.

A conveyor belt is known from German Patent DE-C-2,944,448, which includes self-adhesive strips arranged on the overlapping sides of the belt. However, an adhesive closure within the overlapping zone has the following drawbacks: relative movements are not possible in the overlapping zone. Furthermore, an adhesive lock does not hold up under mechanical stress, and its function is highly impaired by soiling. Moreover, this closure has a greater tendency to freezing and consequently hinders the unfolding at the point of ejection. Similar problems occur also when locking lips are used (German Patent DE-A-2,800,454, and EP-c 046, 690).

According to more recent developments, the tubular conveyor belt is formed by merely overlapping the longitudinal edges of the belt. In this connection, the conveyor belt according to German Patent DE-A-3,606,129 has stable supports (tension supports) in the form of steel wire ropes embedded in its marginal zones overlapping one another, with the ropes extending through in the longitudinal direction. The center part may contain reinforcing inserts extending in the transverse or diagonal direction (German Patent DE-A-3,612,765). This direction of development, however, shows a number of problems, which are described in greater detail below.

First, a conveyor belt is subjected to the greatest mechanical stress at the feeding point of the belt conveyor. Within this zone, the conveyor belt is in the flat to slightly trough-shaped condition. The material to be conveyed mainly impacts the center zone of the conveyor belt. The useful life of the conveyor belt depends on the load-bearing capability of the center zone of the belt. Diagonally arranged strips of fabric consisting of only one or two inserts and intermediate spaces filled only with rubber offer insufficient load-bearing capacity.

Second, overloading may occur in connection with belt conveyors. In this case, the trough-shaped conveyor belt accepts within the feed zone more material than can be accommodated in the tubular condition because of the smaller cross section of the belt in the tubular condition. With a weak reinforcing material, the belt tends to bulge outwardly. The conveyed material forcibly hits the supporting rollers, which may damage the conveyor belt or other parts of the conveyor system.

Third, the fabric inserts are embedded by vulcanization around the steel rope tension support. The tensile stress, almost totally across the ropes present in the marginal zone, as well as the repeated forced shaping to the tubular form (the belt has the tendency to fold open) on each supporting roller in the direction of travel lead to a high mechanical stress in the marginal zone of the belt. This is increased even further by torsion when the belt travels through curves unless another solution, for example, rotatable roller frames, is provided.

Fourth, by limiting the tension supports to the narrow marginal zones of the belt, high strength (tensile strength) belts cannot be formed, or such belts can be formed only if other conveyor belt parameters (e.g. thinner cover plates) are accepted.

Now, a conveyor belt is known from European Patent EP-B-336,385, which has the following tension support variations:

(I) The tension supports consist exclusively of ropes of individual cords which, in the overlapping zone, have a different spacing from each other and/or a different diameter than in the remaining zone of the belt.

(II) The tension supports consist exclusively of warp threads formed with weft threads of a fabric, whereby the fabric has a different structure or make-up in the overlapping zone than in the remaining zone of the belt.

(III) In the overlapping zone, the tension supports consist of aramide ropes or individual aramide cords, whereas the tension supports in the remaining zone of the belt are exclusively warp threads, formed with weft threads of the fabric.

The invention is based on a further development of the belt based on tension support variation II. Tension support variation II continues to show considerable deficiencies with respect to guidance, namely in the open (i.e., trough-shaped) configuration and in the closed (i.e., tubular) configuration, as well as in the transition zone. Particularly disadvantageous is the fact that the reset forces fade quickly after a short period of operation. This finally leads to the fact that the sides of the belt hang into the center of the tube.

SUMMARY OF THE INVENTION

It is therefore an object of the present invention to overcome the deficiencies of the prior art and to provide a conveyor belt with a stable textile support layer having 1 to 5 inserts, preferably 2 or 3 inserts. The support layer is a fabric (e.g. EP, EE; E=polyester, P=polyamide), or a cord fabric. On the running side (i.e., supporting roller side) of the belt, there is embedded, stiff transverse textile reinforcements. The reinforcements are made from polyester or polyamide and are stiff or substantially inflexible.

It is particularly useful if the transverse reinforcements consist of individual synthetic cords. In this way, the individual cords, which are not connected with each other in the longitudinal or warp direction, are not subjected to overexpansion, but increase their spacing (division) between each other as the belt expands.

Also suitable is a transverse reinforcement in the form of a synthetic cord fabric, including warp cords and auxiliary weft threads or filaments.

The transverse reinforcement is alternatively a monofil system made of textile material. The monofil system with individual cords may consist of individual (i.e., isolated) cords, or it may be provided with an auxiliary weft filament. According to DIN 60 900, a "monofil" (also referred to as "wire") is a monofilament yarn with a diameter of more than about 0.1 mm.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
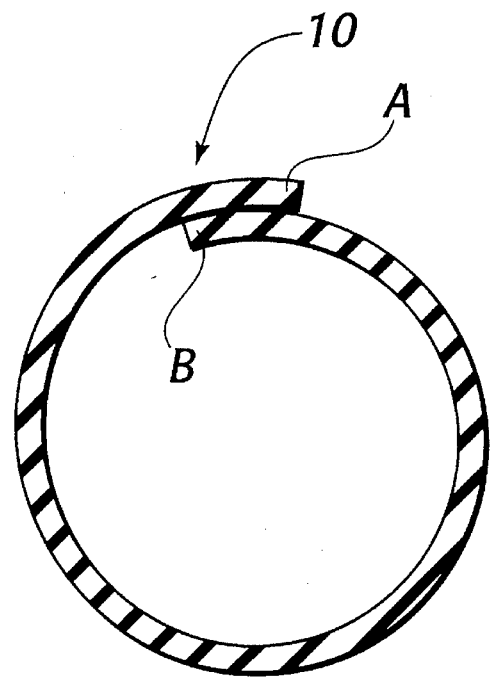
FIG. 1 is a cross-sectional view of a conveyor belt according to the invention in the closed condition, with its longitudinal edges overlapping one another.
Figure 2:
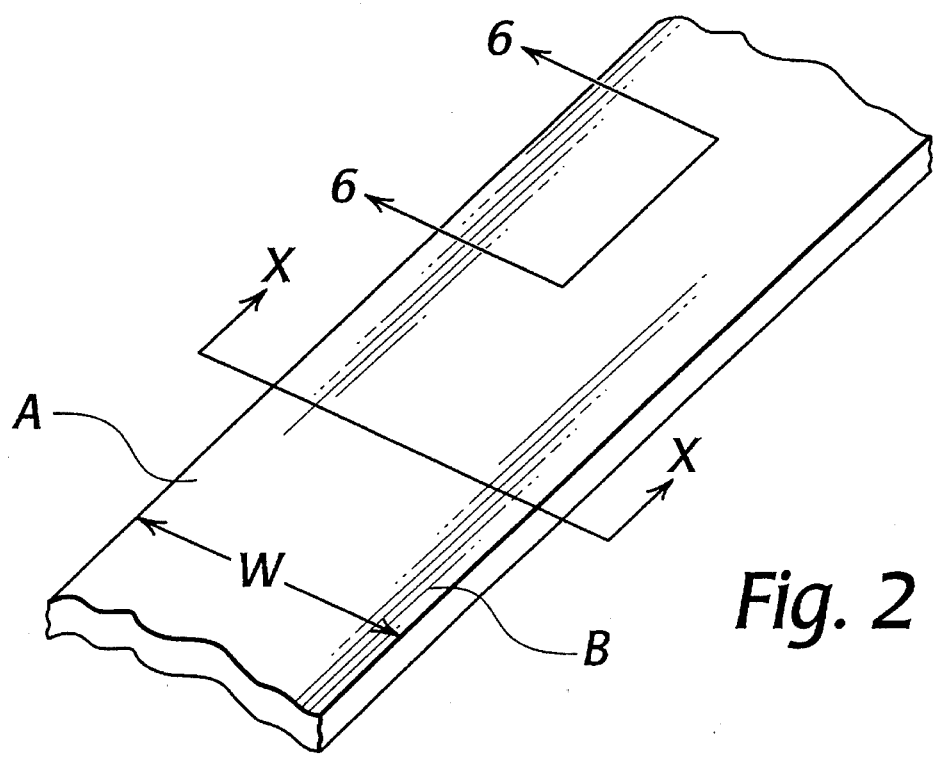
FIG. 2 is a fragmentary perspective view of the conveyor belt in the open position.

Turning now in detail to the drawings, and in particular FIG. 1, there is shown a conveyor belt 10 in the closed, tubular configuration, with the longitudinal edges overlapping. Edge A is the overlap side and edge B is the underlap side. FIG. 2 shows the open conveyor belt with a width W.

Figure 3:
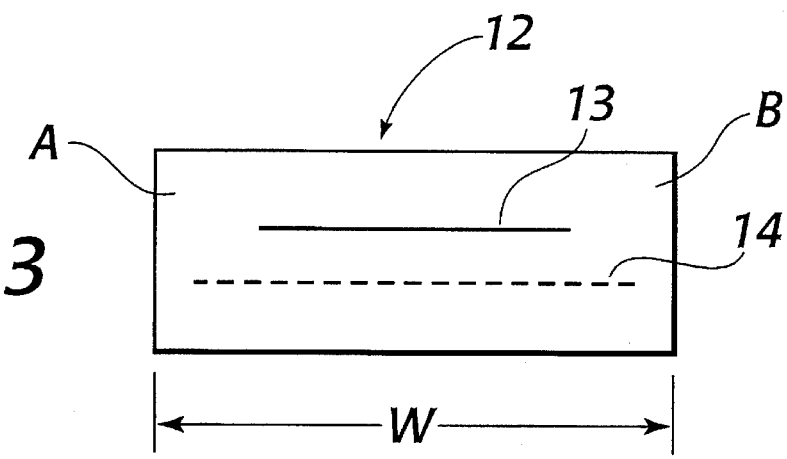
FIG. 3 is a diagrammatical cross-sectional view taken along the line X—X of FIG. 2 showing the support layer relative to the transverse reinforcement.

FIG. 3 shows a one-layer belt 12 having a width "W", a stability support layer 13 and a transverse reinforcement 14. Here, transverse reinforcement 14 is wider than stability support layer 13. The arrangement of support layer 13 and transverse reinforcement 14 relative to one another is symmetric.

Figure 4:
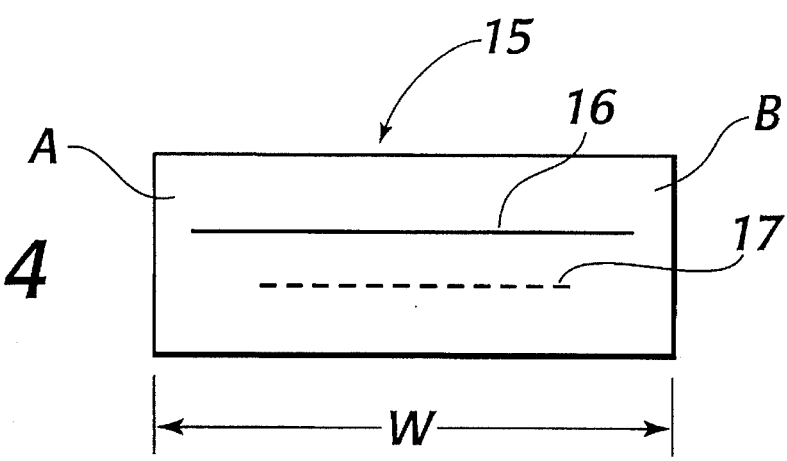
FIG. 4 is a diagrammatical cross-sectional view taken along the line X—X of FIG. 2 showing an alternate embodiment of the support layer relative to the transverse reinforcement.

FIG. 4 shows a one-layer belt 15 with stability support layer 16 and transverse reinforcement 17. In contrast to the embodiment of FIG. 3, transverse reinforcement 17 is narrower than stability support layer 16. The arrangement of support layer 16 and transverse reinforcement 17 relative to one another is symmetric in this case as well.

Figure 5:
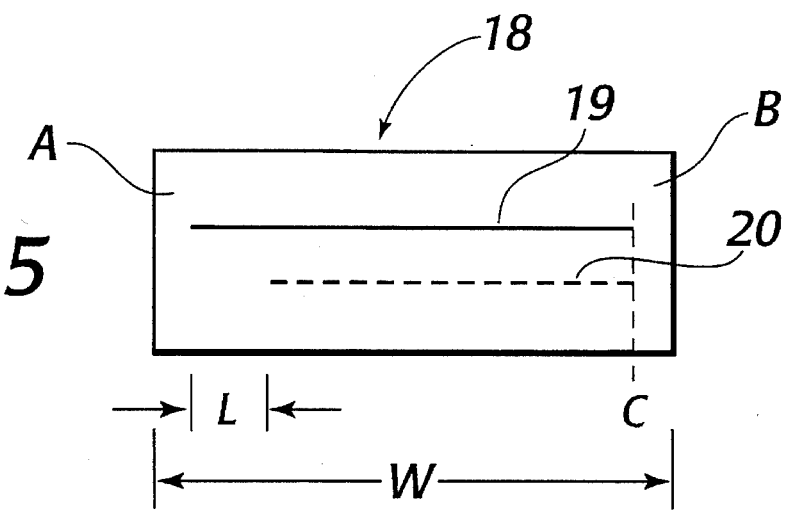
FIG. 5 is a diagrammatical cross-sectional view taken along the line X—X of FIG. 2 showing a further embodiment of the support layer relative to the transverse reinforcement.

FIG. 5 shows another embodiment where a transverse reinforcement 20 of the single layer belt 18 is narrower than the stability support layer 19. However, the arrangement of support layer 19 relative to transverse reinforcement 20 is asymmetric as opposed to the embodiments according to FIGS. 3 and 4. Here, the transverse reinforcement 20 is shifted away from overlap side A by distance "L" toward underlap side B. Support layer 19 is aligned with transverse reinforcement 20 along line C.

Conveyor belts with multiple stability support layers, i.e., 2- and 3-layer belts, have a special significance within the framework of the concept of the invention. The multiple stability support layers are positioned with respect to the transverse reinforcements as shown in FIGS. 3–5, with the multiple layers shown diagrammatically as a single layer 13, 16 or 19.

Figure 6:
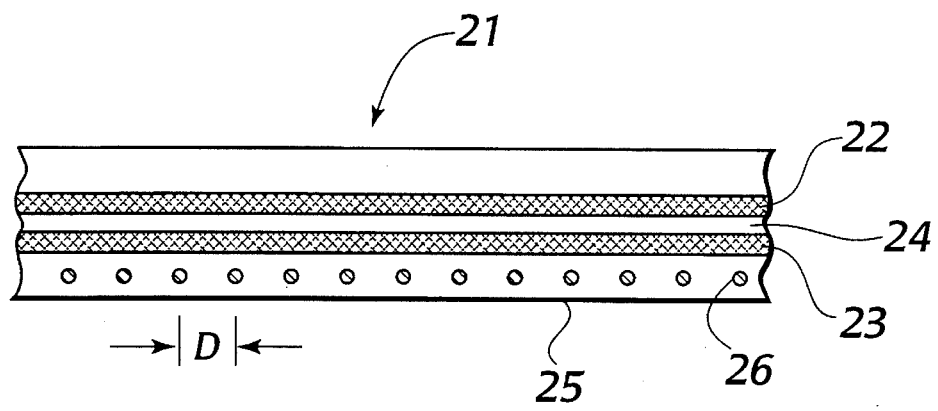
FIG. 6 is a diagrammatical fragmentary cross-sectional view taken along the line 6—6 of FIG. 2 showing an embodiment of a two-layer belt according to the invention.

FIG. 6 shows a 2-layer belt 21 with fabric layers 22 and 23 and an intermediate rubber or gum layer 24. On its running side 25, the belt has embedded, stiff transverse reinforcements 26 having a uniform thickness or diameter (1 to 5 mm, in particularly 1.5 to 3.5 mm). The spacing "D" between the transverse reinforcements 26 is also uniform (5 to 20 mm, particularly 8 to 12 mm) in the longitudinal direction of the conveyor belt.

Figure 7:
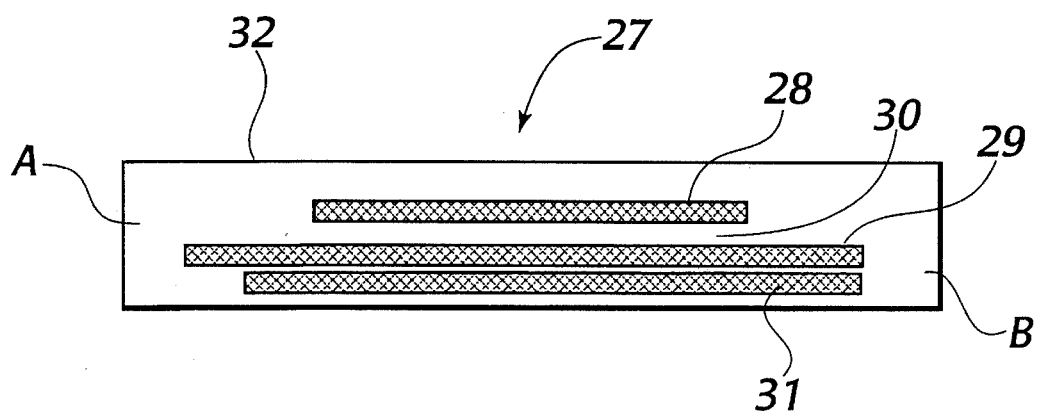
FIG. 7 is a diagrammatical transverse cross-sectional view taken along the line X—X of FIG. 2 of an alternate embodiment of a two-layer belt.
Figure 8:
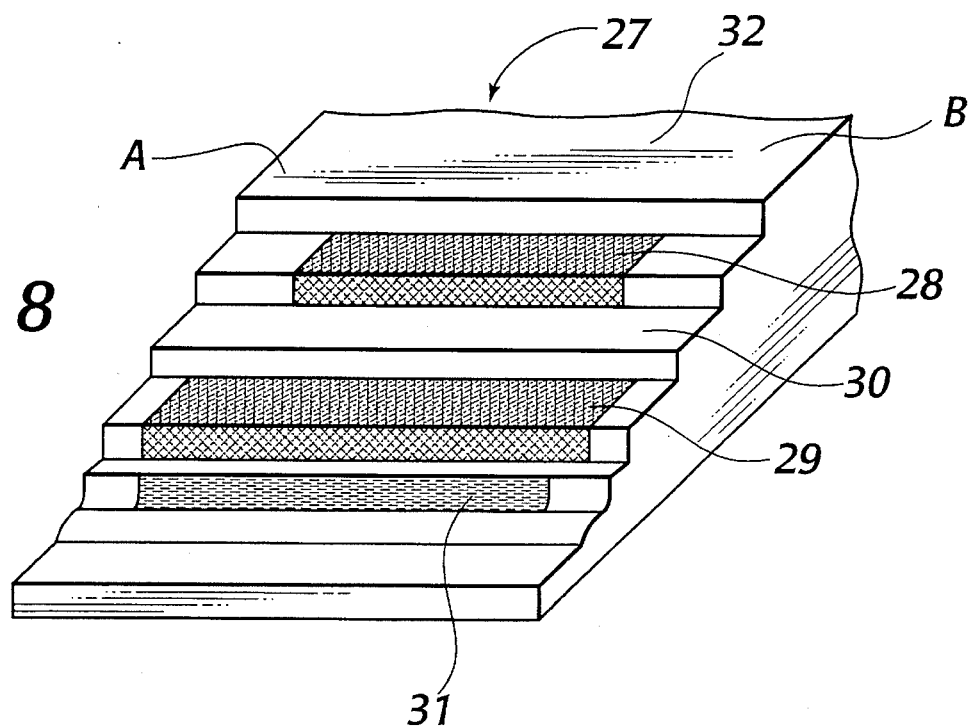
FIG. 8 is a fragmentary perspective view, in part cross section, of the two-layer belt from FIG. 7.

FIGS. 7 and 8 show a further embodiment of a 2-layer belt 27 with fabric layers 28, 29 and an intermediate gum layer 30. Transverse reinforcements 31 are aligned with the right edge of fabric layer 29 similar to FIG. 5. In this connection, the 2-layer stability support structure has a substantially symmetric stepping, with decreasing widths of the layers toward the bearing side 32.

Figure 9:
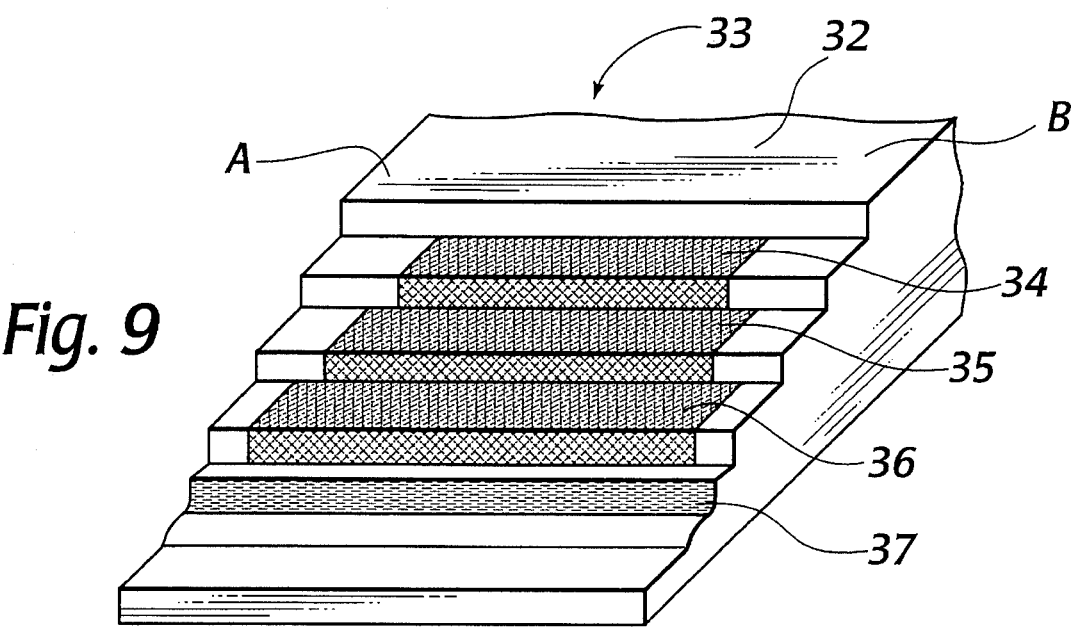
FIG. 9 is a fragmentary perspective view, in part cross section, of an embodiment of a three-layer belt according to the invention.
Figure 10:
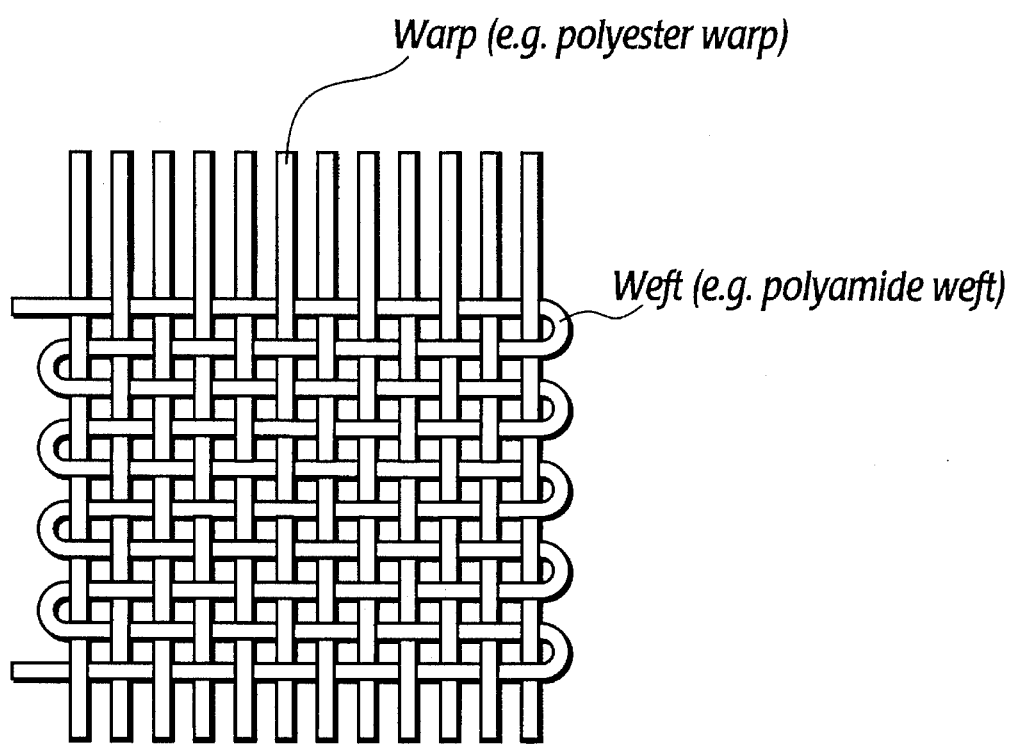
FIG. 10 is a fragmentary perspective view of the conveyor belt showing the warp and weft.
Figure 11:
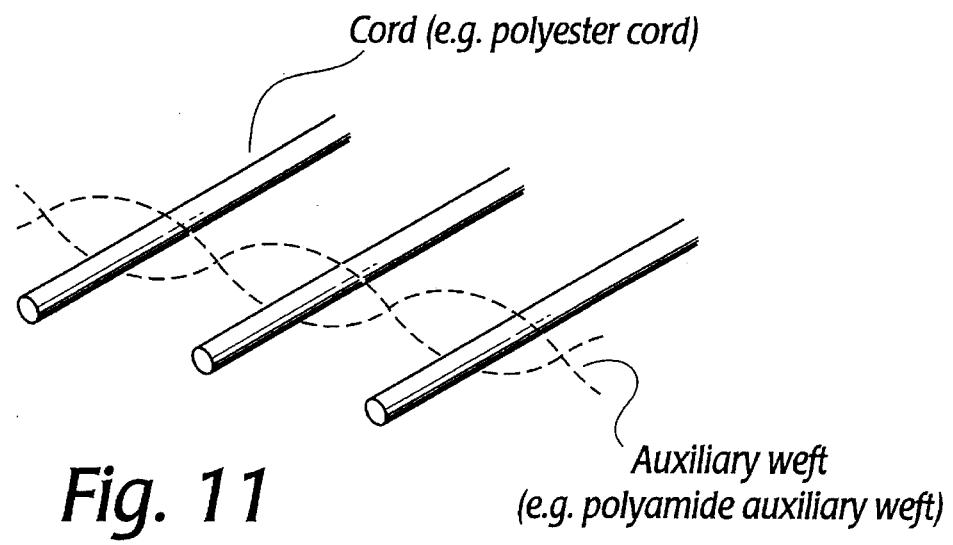
FIG. 11 is a fragmentary perspective view of the conveyor belt showing the cord and auxiliary weft.
Figure 12:
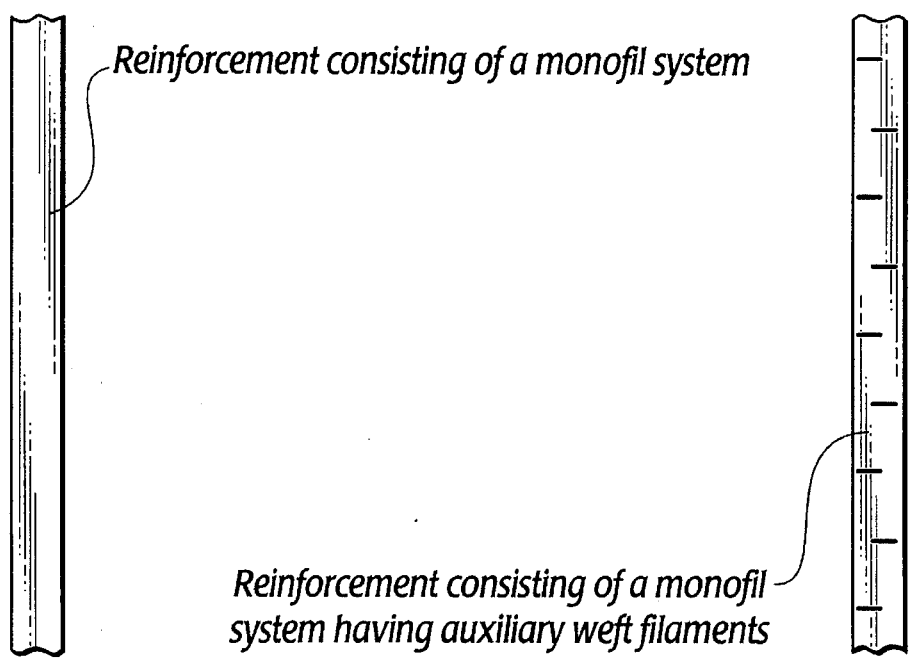
FIG. 12 is a fragmentary perspective view of the monofil system and the auxiliary weft filaments.

FIG. 9 shows a 3-layer belt 33, whereby the fabric layers 34, 35, 36 have the same stepping principle as shown in FIG. 8. However, no intermediate gum layer is present in this case between the individual layers 34, 35 and 36. In the present case, the transverse reinforcement 37 has a larger width than the fabric layer 36 disposed directly above it, as shown in

FIG. 3.

While several embodiments of the present invention have been shown and described, it is to be understood that many changes and modifications may be made thereunto without departing from the spirit and scope of the invention as defined in the appended claims. For example, any number of fabric layers may be provided with or without a gum layer in between each fabric layer. The fabric layers are generally centered across the width of the belt with transverse reinforcements being centered or aligned with the fabric layers.

What is claimed is:

1. A device for transporting materials along supporting rollers comprising:

a conveyor belt extending in a longitudinal direction and having two spaced longitudinal edges, said conveyor belt being made from a material selected from the group consisting of rubber and plastic;

at least one tensile fabric layer embedded within said conveyor belt made from a material selected from the group consisting of a textile having a polyester warp and a polyamide weft, a cord fabric having a polyester cord and a polyamide auxiliary weft and a synthetic cord fabric, said fabric layer extending in the longitudinal direction;

said conveyor belt adapted for being rolled into a tubular belt with said two longitudinal edges overlapping each other, said conveyor belt being supported in the rolled configuration by the supporting rollers; and a plurality of stiff reinforcements embedded within said conveyor belt on a side of said fabric layer facing the support rollers, said plurality of reinforcements being oriented transverse to the longitudinal direction, wherein a side of said fabric layer facing away from the support rollers is devoid of transverse reinforcements.

2. The device according to claim 1, comprising at least two tensile fabric layers.

3. The device according to claim 2, including an intermediate gum layer disposed between two of said tensile fabric layers.

4. The device according to claim 1, wherein each of said plurality of reinforcements is made from an individual synthetic cord.

5. The device according to claim 1, wherein each of said plurality of reinforcements is selected from the group consisting of a monofil system and a monofil system having auxiliary weft filaments.

6. The device according to claim 1, wherein each of said plurality of reinforcements is made from a material selected from the group consisting of polyester and polyamide.

7. The device according to claim 6, wherein each of said plurality of reinforcements has a uniform diameter along its length and with respect to the other reinforcements.

8. The device according to claim 7, wherein the reinforcement diameter is between 1 mm and 5 mm.

9. The device according to claim 8, wherein the reinforcement diameter is between 1.5 mm and 3.5 mm.

10. The device according to claim 9, wherein the spacing between adjacent reinforcements is uniform.

11. The device according to claim 10, wherein adjacent reinforcements are spaced 5 mm to 20 mm from each other.

12. The device according to claim 11, wherein adjacent reinforcements are spaced 8 mm to 12 mm from each other.

13. The device according to claim 12, wherein each of said plurality of reinforcements has a width greater than said tensile fabric layers.

14. The device according to claim 13, wherein said plurality of reinforcements are symmetrically aligned with respect to said tensile fabric layers.

15. A device for transporting materials along supporting rollers comprising:

a conveyor belt extending in a longitudinal direction and having two spaced longitudinal edges;

a tensile fabric layer embedded within said conveyor belt made from a material selected from the group consisting of a textile, a cord fabric and a synthetic cord fabric, said fabric layer extending in the longitudinal direction;

said conveyor belt adapted for being rolled into a tubular belt with said two longitudinal edges overlapping each other, said conveyor belt being supported in the rolled configuration by the supporting rollers; and a plurality of stiff reinforcements embedded within said conveyor belt on a side of said fabric layer facing the support rollers, said plurality of reinforcements being oriented transverse to the longitudinal direction, and being made from a material selected from the group consisting of polyester and polyamide, each reinforcement having a uniform diameter of between 1.5 and 3.5 mm along its length with respect to the other reinforcements, wherein adjacent reinforcements are uniformly spaced from each other a distance of between 8 mm to 12 mm and wherein said reinforcements have a width less than said tensile fabric layers.

16. The device according to claim 15, wherein said plurality of reinforcements are symmetrically aligned with respect to said tensile fabric layers.

17. The device according to claim 15, wherein each of said plurality of reinforcements is aligned with one edge of said tensile fabric layers and has a narrower width than said tensile fabric layers, whereby each of said plurality of reinforcements is asymmetrically aligned with respect to said tensile fabric layers.

18. The device according to claim 17, wherein said tensile fabric layers have a decreasing width in a direction away from the support rollers, and said tensile fabric layers are arranged symmetrically with respect to each other.

* * * * *